United States Patent
Robertson

[11] 3,774,877
[45] Nov. 27, 1973

[54] VALVE

[76] Inventor: Walter W. Robertson, P.O. Box 86, Girard, Pa. 16417

[22] Filed: Aug. 8, 1972

[21] Appl. No.: 278,873

[52] U.S. Cl............... 251/30, 251/175, 251/282
[51] Int. Cl............................................. F16k 1/32
[58] Field of Search..................... 251/282, 175, 30

[56] References Cited
UNITED STATES PATENTS

| | | | |
|---|---|---|---|
| 3,385,561 | 5/1968 | Whalen | 251/282 |
| 3,469,818 | 9/1969 | Cowan | 251/175 X |
| 3,700,209 | 10/1972 | Usry | 251/282 |

*Primary Examiner*—Arnold Rosenthal
*Attorney*—Ralph Hammar

[57] ABSTRACT

A two way valve for controlling flow between pressures (P1) and (P2) which is biased closed by a spring overcoming the weight of the moving valve operating member and also by pressures (P1) and (P2) so the valve is fail-safe whether (P1) is less than, equal to, or greater than (P2). This is accomplished by dividing the moving valve operating member into two parts acting cumulatively or in series with one part biased closed by (P1) and open by (P2) and with the other part biased closed by (P2).

6 Claims, 2 Drawing Figures

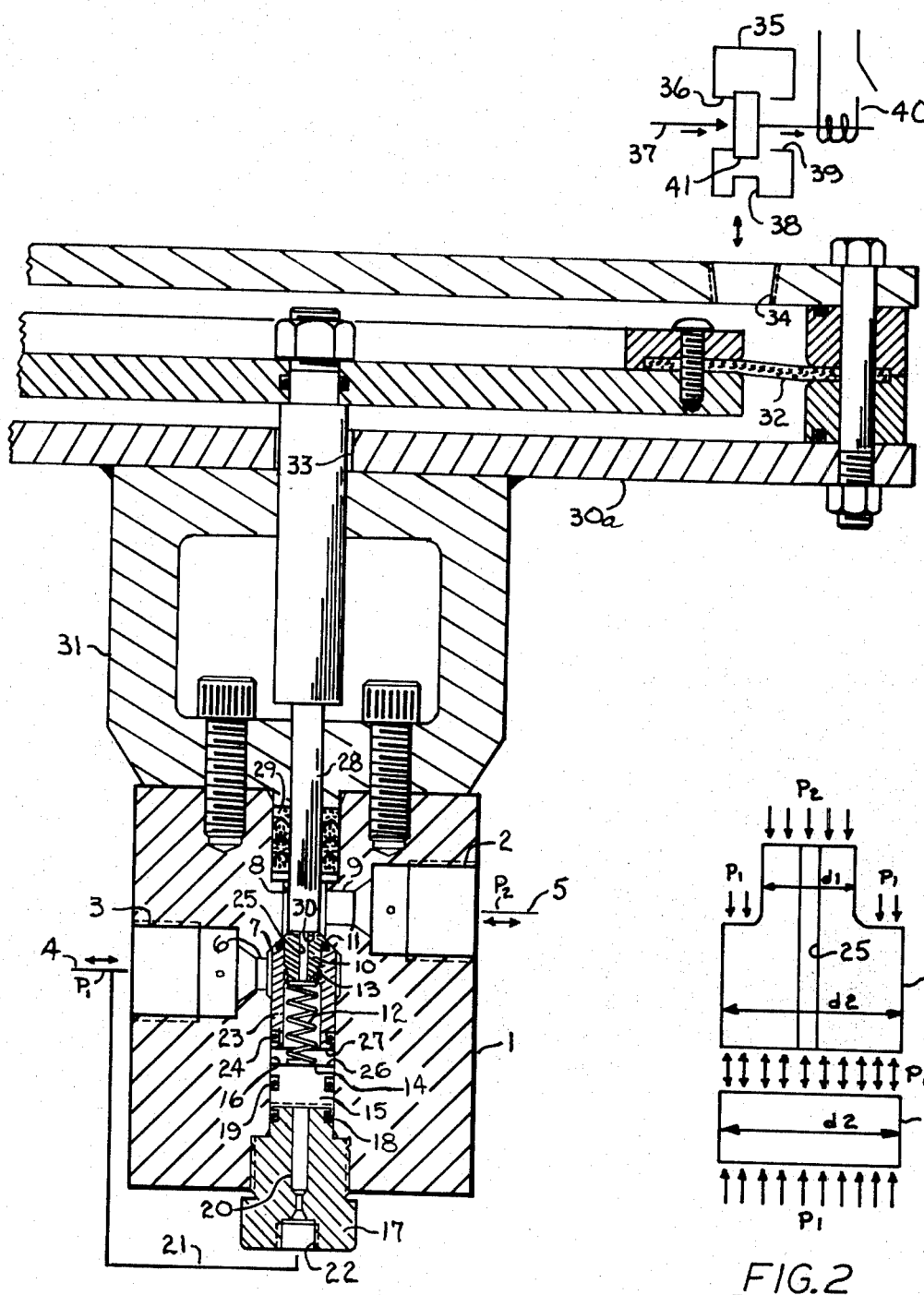

VALVE

This invention is a balanced valve in which the moving valve operating member comprises two parts acting in series and respectively exerting a closing force from the inlet and outlet pressures. The valve has fail-safe properties since both pressures are usable to bias the valve closed.

In the drawing,

FIG. 1 is a section through a valve and

FIG. 2 is a free body diagram of the pressure forces on the moving valve operating member.

The valve body 1 has fittings 2, 3, one of which may be an inlet fitting and the other of which may be an outlet fitting. In service, fitting 3 is connected to a line 4 carrying a pressure P1 and fitting 2 is connected to a line 5 carrying a pressure P2. A way 6 leads from fitting 3 to one side of a valve seat 7 leading to a valve port 8. The fitting 2 leads to a way 9 connected to the valve port on the opposite side of the seat 7. Flow through the valve port 8 is controlled by a valve member 10 having a sealing element 11 closing against the valve seat. The valve member 10 is biased to the closed position by a spring 12 arranged between a seat 13 on the valve member and a seat 14 on a piston 15 slidable toward and away from the valve seat in a bore 16 in the body. The lower end of the piston 15 butts against the upper end of a plug 17 screwed into the body and sealed to the bore 16 by any suitable sealing element 18 such as an O-ring. A similar sealing element 19 seals the piston 15 to the bore. The under side of the piston 15 is supplied with pressure P1 through a way 20 in the plug which may, for example, be supplied by a line 21 leading from line 4 to fitting 22 in the lower end of the plug 17. The pressure P1 could obviously be supplied to the fitting 22 by connecting the line 21 to any other portion subject to pressure P1, such as the way 6 leading from the fitting 3. Above the piston 15 is a piston 23 sealed to the bore 16 by a sealing element 24. The upper end of the piston 23 is fixed to the valve member 10. A way 25 conducts pressure P2 to the space between the upper end of piston 15 and the lower end of piston 23. Pressure P2 accordingly is at all times present and exerting a downward force on the piston 15 and an upward or valve closing force on the lower end of the piston 23.

There are several conditions under which the valve will be closed. First, when P1 and P2 are both equal to zero, the valve member 10 will be closed by the spring 12. This will also be true for all other conditions under which P1 is equal to P2. Second, when P2 is greater than P1 the piston 15 will be held in its lowermost position as shown in FIG. 1 and the valve member 10 will be held in its closed position by the force acting on the lower end of piston 23 which is greater than the downward force acting on the portion of the upper end of the piston 23 within the sealing element 11. Third, when P1 is greater than P2, the piston 15 will be raised so that its surface 26 abuts the lower end surface 27 of the piston 23 and holds the piston 23 in its uppermost position as shown in FIG. 1. The forces are shown in the free body diagram of FIG. 2 where the diameter of the piston 23 within the seal 11 is indicated at $d1$ and the diameter of the piston 15 and of the lower end of the piston 23 is indicated at $d2$. From this diagram it can be determined that when P1 is greater than or equal to P2, the closing force is equal to $(P1 - P2)\pi/4\, d1^2$, a force which becomes zero when P1 is equal to P2. When P2 is greater than P1, the closing force is equal to $(P2 - P1)(d2^2 - d1^2)\pi/4$. The valve, therefore, fails-safe in the sense that it is biased to the closed position under all conditions.

The valve is opened by a push rod 28 extending into the valve body 1 through a stuffing box 29 and having its lower end 30 abutting the upper end of the valve member 10. When the push rod 28 is urged downward, it pushes the valve member 10 away from the valve seat 7 and opens the valve. The particular structure for actuating the push rod 28 comprises a pneumatic diaphragm actuator 30a fixed to the upper end of a frame member 31 on the valve body 1. The diaphragm actuator has a diaphragm 32 with the lower side vented to atmosphere through an opening 33 around the push rod 28 and having the upper side presented to a source of pressure through a fitting 34. The pressure supplied to the fitting 34 is controlled by a normally closed three-way solenoid valve 35 having an inlet fitting 36 for connection to a pressure line 37, an outlet fitting 38 for connection to the supply fitting 34 of the diaphragm activator 30a and a vent fitting 39. When the solenoid 40 is de-energized as shown, a valve member 41 is biased to close the inlet fitting 36 and to open the outlet fitting 39. When the solenoid is energized, the valve member 41 opens the inlet fitting 36 and closes the outlet fitting 39. This supplies pressure to the upper side of the diaphragm 32 and urges the push rod 28 downward to open the valve. The valve operator including the diaphragm actuator and the three-way valve 35 is also fail-safe. Upon failure of the electric power supply, the pressure to the upper side of the diaphragm 32 is vented through way 39 so that the valve member 10 is urged to the closed position by the spring 12.

The spring 12 need only be strong enough to overcome friction and to lift the piston 23 under conditions when P1 is equal to P2. Under all other conditions the fluid pressure assists the closing of the valve. Opening of the valve is effected by the actuator 30a which can be sized to exert the required force.

The particular valve shown is a one inch valve for controlling pressures of 20,000 pounds per square inch.

What is claimed is:

1. A valve for controlling the flow between pressures P1 and P2 comprising a body having a connection to P1, a connection to P2, a flow path between said connections, a port in said flow path, a valve member for opening and closing said port, means for closing the valve comprising first and second pistons for exerting a force on said valve member in one direction to close said port, said first piston having one side facing said one direction, a way leading from P1 to the other side of said first piston for supplying pressure P1 exerting a force on said first piston in said one direction, said second piston having one side facing said one direction and in force transmitting relation to said valve member and the other side presented to said one side of the first piston, a way leading from P2 to the other side of said second piston for supplying pressure P2 exerting a force on said second piston in said one direction and for exerting a force on said one side of the first piston in the opposite direction, means for opening the valve, and a force transmitting abutment between said pistons for transmitting forces from one piston to the other.

2. The valve of claim 1 in which a spring arranged between said one side of the first piston and the other side of the second piston exerts a force in said one direction.

3. The valve of claim 1 in which said valve member is fixed to said one side of the second piston.

4. The valve of claim 1 in which the means for opening the valve comprises a push rod exerting a force on said valve member in said opposite direction.

5. The valve of claim 4 in which the operating force is applied to the push rod by a fluid actuator.

6. The valve of claim 4 in which the fluid actuator is supplied through a three-way solenoid valve having a pressure inlet for connection to a supply line, a pressure outlet connected to the fluid actuator and a vent, said valve being normally biased to close the pressure inlet and open the vent and being actuated by the solenoid to open the pressure inlet and close the vent.

* * * * *